R. A. Goodyear,
Snap Hook,
N° 46,659. Patented Mar. 7, 1865.
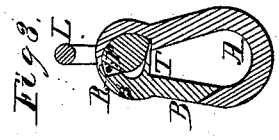
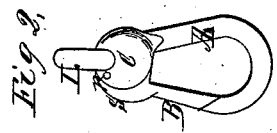
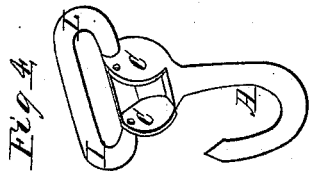
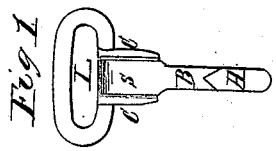
Witnesses,
L. Downy
Jos. L. Coombs
Inventor.
Robert A. Goodyear
by
A. Pollok
his atty

UNITED STATES PATENT OFFICE.

ROBERT A. GOODYEAR, OF NEW HAVEN, CONNECTICUT.

IMPROVEMENT IN SNAP-HOOKS.

Specification forming part of Letters Patent No. 46,659, dated March 7, 1865.

*To all whom it may concern:*

Be it known that I, ROBERT A. GOODYEAR, of New Haven, in the county of New Haven and State of Connecticut, have invented certain new and useful Improvements in Snap-Hooks; and I hereby declare that the following is a full, clear, and exact description of the same, reference being had to the accompanying drawings, in which—

Figure 1 is a front, Fig. 2 a side, and Fig. 3 a sectional, elevation of a hook constructed in accordance with this my invention, Figs. 4, 5, and 6 being perspective views of the parts thereof detached.

This invention relates to the manufacture of snap-hooks in which, for the purpose of making the hook self-closing, an india-rubber or other spring is used within the hinge-socket, or thereabout, in lieu of the ordinary outside steel spring. Although both superior in action and durability over the ordinary metallic spring-hooks, the snap-hooks with india-rubber or other springs located as described were liable to the two-fold objection, first, expense in the manufacture, owing to the drilling of the hole through the solid shank or hinge portion of the snap-bar, and, secondly, insufficiency of spring-action on account of the limited space for the locating of a spring of requisite size. The object of my invention, therefore, is to remedy these defects, and I have accomplished this by simply recessing the shank or hinge portion of the snap-bar in the manner hereinafter more fully explained; and in order that my invention may be fully appreciated I would here observe that the most expeditious mode of drilling the holes through the cheeks of the hook and the shank of the snap-bar consists in using two drills revolving upon one and the same axis and having a translatory movement in the direction of their common axis. The two holes in the two cheeks of the hook may thus be made at one operation—that is, by simultaneously imparting to the drills a rotary and a converging translatory movement. But if this were attempted to be done through a single thickness of metal or through the solid portion of the shank of the snap-bar the two drills would come together and abrade each other. It is therefore necessary to alternate the action of the two drills and first to bore the hole half-way with the one drill and then half-way with the other drill, an operation involving considerable loss of time and consequently expense, which in the manufacture of such articles is of great moment.

To enable others to make and use this invention, I shall now proceed to describe its construction and operation.

The hook as constructed in accordance with the improvement subject of this patent is composed of three parts—

First. The hook proper, A, which is made in the usual manner, with a loop, L, for the attachment thereto of a strap, and with cheeks C, which constitute parts of both the spring-case and the hinge. The latter I prefer to recess as much as possible consistently with the strength necessary.

Second. The snap-bar or closing-lever B. It is fitted as usual to the hook by means of a pin, $p$, traversing the cheeks C of the hook and the shank S of the bar. The shank portion S, I make of a concavo-convex form, the cavity being on the interior and facing that of the hook. A tongue, T, projects from the under side of the said cavity into the spring-chamber. The upper end of the shank is also recessed at R, and the hole through which the pin $p$, uniting the bar with the hook, traverses is made through this recessed part R. By thus constructing the snap-bar the hole may be drilled in as expeditious a manner as this is done on the hook or through the cheeks thereof. Both drills may thus be engaged simultaneously and rotated convergingly until the holes are completed. The further advantage due to this arrangement is, that a larger spring, which constitutes the third part of the hook, may be used. This feature is of great importance in snap-hooks where the spring used is made of vulcanized india-rubber, whose elasticity, other things being equal, is proportionate to its size. The spring used in connection with the hook shown is represented in Fig. 5.

And having thus described my invention, I claim—

1. The recessed shank of the closing-bar when constructed for operation substantially in the manner and for the purposes set forth.

2. As a new article of manufacture, a snap-hook, the same consisting of a hook, a recessed hinge or closing bar and spring, combined in the manner substantially as set forth.

3. In combination with the recessed hinge bar and hook of a vulcanized india-rubber spring, the whole being constructed and combined in the manner and for the purposes set forth.

In testimony whereof I have signed my name to this specification before two subscribing witnesses.

R. A. GOODYEAR.

Witnesses:
 GEO. E. BLAKESLEE,
 WM. A. REYNOLDS.